(12) United States Patent  
Inokuma (10) Patent No.: US 7,619,634 B2
(45) Date of Patent: Nov. 17, 2009

(54) IMAGE DISPLAY APPARATUS AND IMAGE DATA TRANSFER METHOD

(75) Inventor: Kazuyuki Inokuma, Yawata (JP)

(73) Assignee: Panasonic Corporation, Osaka (JP)

( * ) Notice: Subject to any disclaimer, the term of this patent is extended or adjusted under 35 U.S.C. 154(b) by 729 days.

(21) Appl. No.: 10/992,103

(22) Filed: Nov. 19, 2004

(65) Prior Publication Data

US 2005/0128299 A1 Jun. 16, 2005

(30) Foreign Application Priority Data

Nov. 28, 2003 (JP) ............................. 2003-399972

(51) Int. Cl.
*G09G 5/00* (2006.01)
*H04N 5/262* (2006.01)
*H04N 9/74* (2006.01)

(52) U.S. Cl. ....................... 345/581; 345/629; 348/239; 348/589

(58) Field of Classification Search ................. 345/581, 345/629; 348/14.07–14.12, 207.1, 207.11, 348/239, 589

See application file for complete search history.

(56) References Cited

U.S. PATENT DOCUMENTS

| 2002/0053053 | A1* | 5/2002 | Nagai et al. .................. 714/712 |
| 2003/0160773 | A1* | 8/2003 | Higashi et al. ............... 345/204 |
| 2003/0227460 | A1* | 12/2003 | Schinnerer .................. 345/539 |
| 2004/0073321 | A1* | 4/2004 | Kondo ........................ 700/28 |
| 2006/0072030 | A1* | 4/2006 | Silverbrook ................. 348/345 |

FOREIGN PATENT DOCUMENTS

| JP | 2000-244673 | 9/2000 |
| JP | 2000-267642 A | 9/2000 |

OTHER PUBLICATIONS

Machine translation of the Japanese patent document, JP 2000-267642 A, cited by applicants.*
"Hardware Functional Specification; S1D13706 Embedded Memory LCD Controller," Document No. X31B-A-001-10, issued on Jul. 28, 2005; Seiko Epson Corporation.

* cited by examiner

*Primary Examiner*—Kee M Tung
*Assistant Examiner*—Tize Ma
(74) *Attorney, Agent, or Firm*—McDermott Will & Emery LLP (57) ABSTRACT

An image display apparatus that prevents a transfer of data of a main image from going into wait state when two or more types of image data, which are generated by different generators, are transferred in parallel. In the image display apparatus: a first image data generating unit generates first image data, divides it into a plurality of data pieces, and intermittently outputs the data pieces which each have a predetermined size smaller than a data size of one screen; a second image data generating unit generates and outputs second image data; an image display unit displays an image represented by the first and second image data; and a transfer arbitration unit transfers the data pieces to the image display unit, and transfers part or all of the second image data to the image display unit during a period in which any of the data pieces is not transferred.

25 Claims, 11 Drawing Sheets

IMAGE DISPLAY APPARATUS AND IMAGE DATA TRANSFER METHOD

BACKGROUND OF THE INVENTION (1) Field of the Invention

The present invention relates to an image display apparatus, and specifically relates to a process in which a plurality of pieces of image data, which are generated by different generators, are transferred therefrom to an image display unit in parallel.

(2) Description of the Related Art

In recent years, camera-equipped mobile-phones have been a main staple of mobile-phones.

Figure 11:
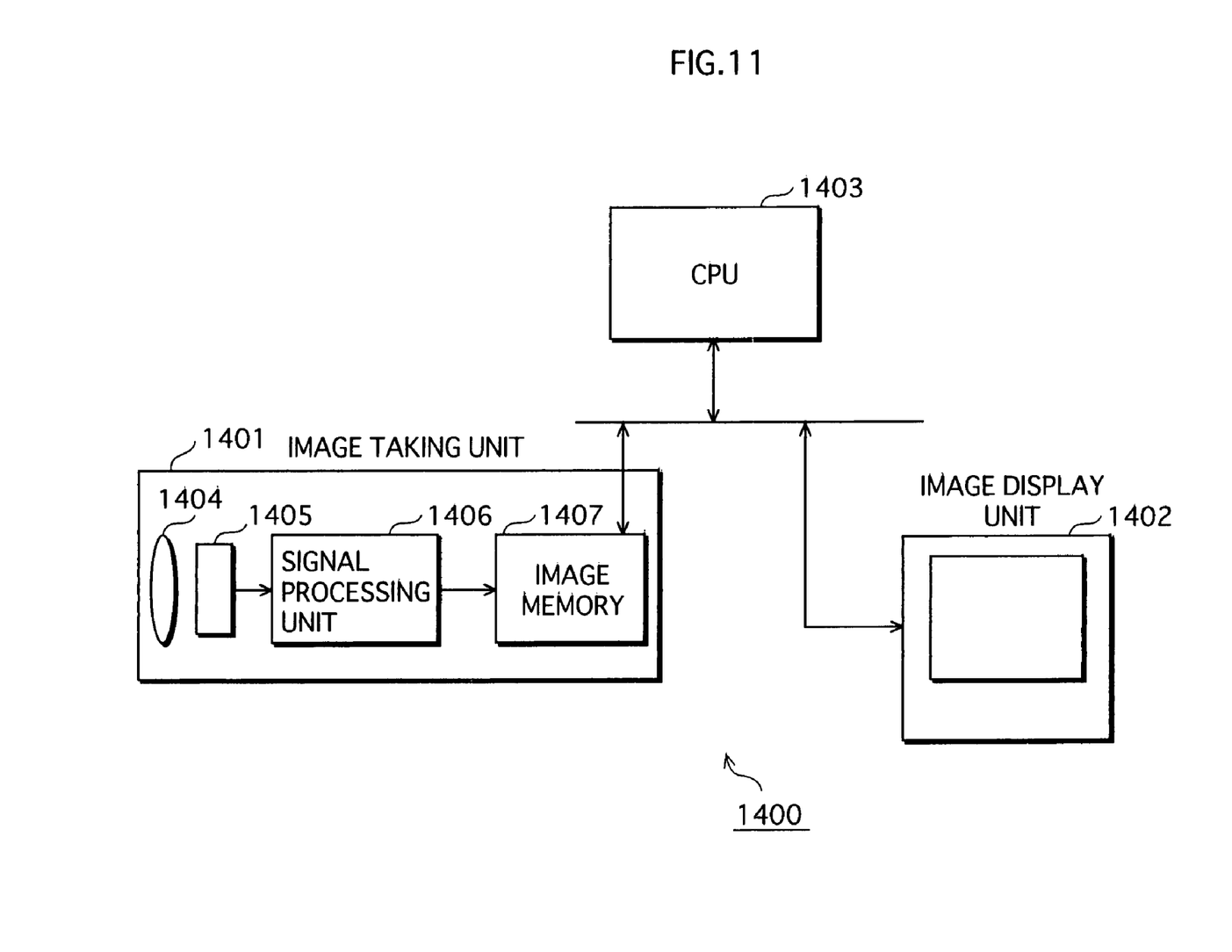
FIG. 11 shows the functional structure of a conventional display system.

FIG. 11 shows an example of the functional structure of a taken-image display system loaded in a camera-equipped mobile-phone.

As shown in FIG. 11, a taken-image display system 1400 includes an image taking unit 1401, an image display unit 1402, and a CPU 1403.

The image taking unit 1401 includes: a lens 1404 used to form an optical image; an image sensor 1405; a signal processing unit 1406; and an image memory 1407.

The image sensor 1405 generates an electric signal in sequence by performing a light-to-electric conversion onto the optical image formed by the lens 1404.

The signal processing unit 1406 sequentially converts the electric signal generated by the image sensor 1405 into image data in a predetermined format (hereinafter, the image data generated by the signal processing unit 1406 is referred to as "natural image data", and an image represented by the natural image data is referred to as a "natural image"). The signal processing unit 1406 stores at least one screen of image data into the image memory 1407.

The CPU 1403 performs an artificial image data generation process in which it generates image data representing characters, drawings and the like that are to be displayed on a screen together with a natural image (hereinafter, the image data generated by the CPU 1403 is referred to as "artificial image data", and an image represented by the artificial image data is referred to as an "artificial image"). The CPU 1403 also performs a transmission process in which it transmits the generated artificial image data or the natural image data stored in the image memory 1407 to the image display unit 1402. The CPU 1403 also performs an instruction issuing process in which it issues an instruction such as an image drawing instruction to the image display unit 1402.

The image display unit 1402 performs a drawing process in which it draws a predetermined graphic image in accordance with the image drawing instruction received from the CPU 1403. The image display unit 1402 also performs a composite image generation process in which it generates a composite image from the natural image data and the artificial image data received from the CPU 1403. The image display unit 1402 displays the graphic image and the composite image on a screen.

Meanwhile, in the above-described construction of the taken-image display system 1400, the CPU 1403 performs the transmission process in parallel with other processes. As a result, a transfer of the natural image data or the artificial image data may go into wait state. This prevents the image display unit 1402 from smoothly displaying the natural image, or the main image. That is to say, this prevents display of a high-quality image.

SUMMARY OF THE INVENTION

The object of the present invention is therefore to provide an image display apparatus that prevents a transfer of data of the main image from going into wait state when two or more types of image data such as the natural image data and the artificial image data, which are generated by different generators, are transferred in parallel, and to provide technologies related to the image display apparatus.

The above object is fulfilled by an image display apparatus comprising: a first image data generating unit operable to generate first image data, divide the first image data into a plurality of data pieces, and intermittently output the data pieces which each have a predetermined size smaller than a data size of one screen; a second image data generating unit operable to generate and output second image data; an image display unit operable to display an image which is represented by the first image data and the second image data; and a transfer arbitration unit operable to transfer the data pieces, which are intermittently output from the first image data generating unit, to the image display unit, and transfer part or all of the second image data, which is output from the second image data generating unit, to the image display unit during a period in which any of the data pieces is not transferred to the image display unit.

With the above-stated construction, it is possible to transfer the first and second image data to the image display unit without suspending the transfer of the first image data generated by the first image data generating unit.

In the above-described image display apparatus, the first image data generating unit may include: a buffer having a predetermined size; and a buffer control sub-unit operable to write the first image data into the buffer at a predetermined speed, intermittently read the data pieces of the first image data one by one from the buffer, and output the read data pieces to the transfer arbitration unit.

With the above-stated construction in which the first image data generating unit includes a buffer having a predetermined size smaller than a data size of one screen for the first image data, the image display apparatus requires a lower cost than a conventional one.

In the above-described image display apparatus, the second image data generating unit may include a sub-unit operable to notify the transfer arbitration unit of a request for a transfer of the generated second image data, and the transfer arbitration unit includes a sub-unit operable to, if the transfer arbitration unit receives the request for the transfer of the generated second image data from the second image data generating unit while transferring the data pieces of the first image data, notify the second image data generating unit of an instruction to suspend the transfer of the generated second image data.

In the above-described image display apparatus, the transfer arbitration unit may include a sub-unit operable to notify the second image data generating unit of transfer frequency information that indicates a frequency with which the data pieces of the first image data are transferred, and the second image data generating unit includes a sub-unit operable to notify the transfer arbitration unit of a request for a transfer of the generated second image data, based on the transfer frequency information notified by the transfer arbitration unit.

With the above-stated construction, the second image data generating unit can send a request for a transfer of the second image data during a period in which the first image data is transferred with a low frequency, based on the transfer frequency information, for example. This enables the image data transfer process to be performed efficiently.

In the above-described image display apparatus, the image display unit may include a sub-unit operable to notify the transfer arbitration unit of an instruction to suspend transfers of the first and second image data, and the transfer arbitration unit suspends the transfers of the first and second image data to the image display unit, in accordance with the instruction to suspend the transfers notified by the image display unit.

In the above-described image display apparatus, the transfer arbitration unit may include a protocol setting sub-unit operable to set transfer protocols respectively for transferring the first image data and the second image data to the image display unit.

With the above-stated construction, the transfer arbitration unit can transfer the first and second image data using the protocols that are respectively set for them and conform to the image display unit.

In the above-described image display apparatus, the first image data generating unit may include an image data generation speed adjustment sub-unit operable to adjust a speed at which the first image data is generated, in accordance with a frame size of an image for display on the image display unit.

With the above-stated construction, it is possible to adjust the first image data generation speed to an optimum speed, in accordance with a frame size of an image for display on the image display unit.

In the above-described image display apparatus, the transfer arbitration unit may include a transfer speed measuring sub-unit operable to measure a speed at which image data is transferred to the image display unit, and the image data generation speed adjustment sub-unit adjusts the speed at which the first image data is generated, based on a result of the measurement of the image data transfer speed by the transfer speed measuring sub-unit.

With the above-stated construction, it is possible to adjust the first image data transfer speed to an optimum speed.

The above object is also fulfilled by an image display apparatus comprising: an image taking unit operable to obtain first image data by taking an image, divide the first image data into a plurality of data pieces, and intermittently output the data pieces which each have a predetermined size smaller than a data size of one screen; a second image data generating unit operable to generate and output second image data; an image display unit operable to display an image which is represented by the first image data and the second image data; and a transfer arbitration unit operable to transfer the data pieces, which are intermittently output from the first image data generating unit, to the image display unit, and transfer part or all of the second image data, which is output from the second image data generating unit, to the image display unit during a period in which any of the data pieces is not transferred to the image display unit.

With the above-stated construction, it is possible to transfer the first and second image data to the image display unit without suspending the transfer of the first image data generated by the image taking unit.

In the above-described image display apparatus, the image taking unit and the transfer arbitration unit may be achieved in a semiconductor chip.

The above object is also fulfilled by an image data transfer method for use in an image display apparatus including: an image display unit operable to display an image which is represented by first image data and second image data; a first image data generating unit operable to generate the first image data; and a second image data generating unit operable to generate the second image data, the image data transfer method comprising the steps of: dividing the first image data into a plurality of data pieces, and intermittently transferring the data pieces, which each have a predetermined size smaller than a data size of one screen, to the image display unit; and transferring part or all of the second image data, which is output from the second image data generating unit, to the image display unit during a period in which any of the data pieces is not transferred to the image display unit.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings.

DESCRIPTION OF THE PREFERRED EMBODIMENT

The following describes an image display apparatus as a preferred embodiment of the present invention, with reference to the attached drawings.

<Construction>

Figure 1:
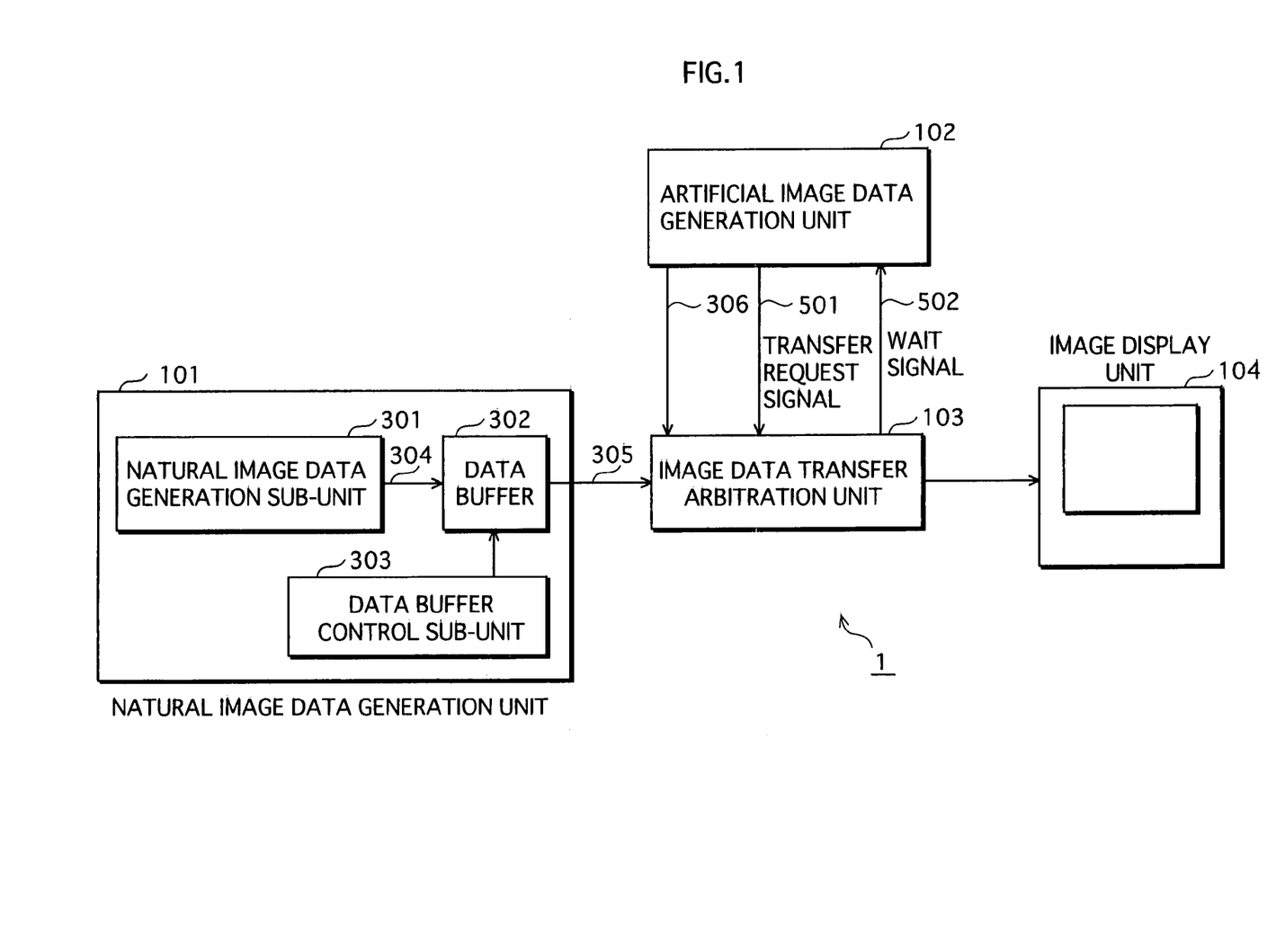
FIG. 1 shows the functional structure of the image display apparatus in the present embodiment.

FIG. 1 shows the functional structure of the image display apparatus in the present embodiment.

An image display apparatus 1 includes a natural image data generation unit 101, an artificial image data generation unit 102, an image data transfer arbitration unit 103, and an image display unit 104.

The image display apparatus 1 is a computer composed of hardware components such as a CPU, an input apparatus, an output apparatus, and a storage apparatus. The CPU executes a control program stored in the storage apparatus to control the operation of each component.

The natural image data generation unit 101 includes a natural image data generation sub-unit 301, a data buffer 302, and a data buffer control sub-unit 303.

The natural image data generation sub-unit 301 generates natural image data.

The data buffer 302 is a memory having a predetermined size for storing part of the natural image data.

The data buffer control sub-unit 303 controls writing of natural image data 304 from the natural image data generation sub-unit 301 into the data buffer 302, and controls transferring of natural image data written in the data buffer 302 to the image data transfer arbitration unit 103.

The data buffer control sub-unit 303 reads and transmits the natural image data with less time than writing thereof. Therefore, the data buffer control sub-unit 303 intermittently transmits the natural image data, which is read from the data buffer 302, to the image data transfer arbitration unit 103.

The artificial image data generation unit 102 generates artificial image data, and then activates a transfer request signal 501 to notify the image data transfer arbitration unit 103 of an artificial image data transfer request, a request for a transfer of the artificial image data.

The image data transfer arbitration unit 103 arbitrates the transfer to the image display unit 104 of (a) the natural image data output from the natural image data generation unit 101 and (b) the artificial image data output from the artificial image data generation unit 102.

In the present embodiment, it is presumed that the image data transfer arbitration unit 103 is achieved by hardware that is not a CPU.

Upon being notified of the artificial image data transfer request from the artificial image data generation unit 102 through the activation of the transfer request signal 501, the image data transfer arbitration unit 103 receives the artificial image data from the artificial image data generation unit 102 and transfers it to the image display unit 104 if the natural image data is not being transferred, and if the natural image data is being transferred, activates a wait signal 502 to notify the artificial image data generation unit 102 of an instruction to suspend the transfer of the artificial image data.

The image display unit 104 receives the natural image data and the artificial image data through the arbitration of the image data transfer arbitration unit 103, and displays an image on a screen. The image display unit 104 achieves this function using a liquid-crystal display and an image display control circuit.

<Operation>

Now, how the image data transfer is arbitrated will be described.

Figure 2:
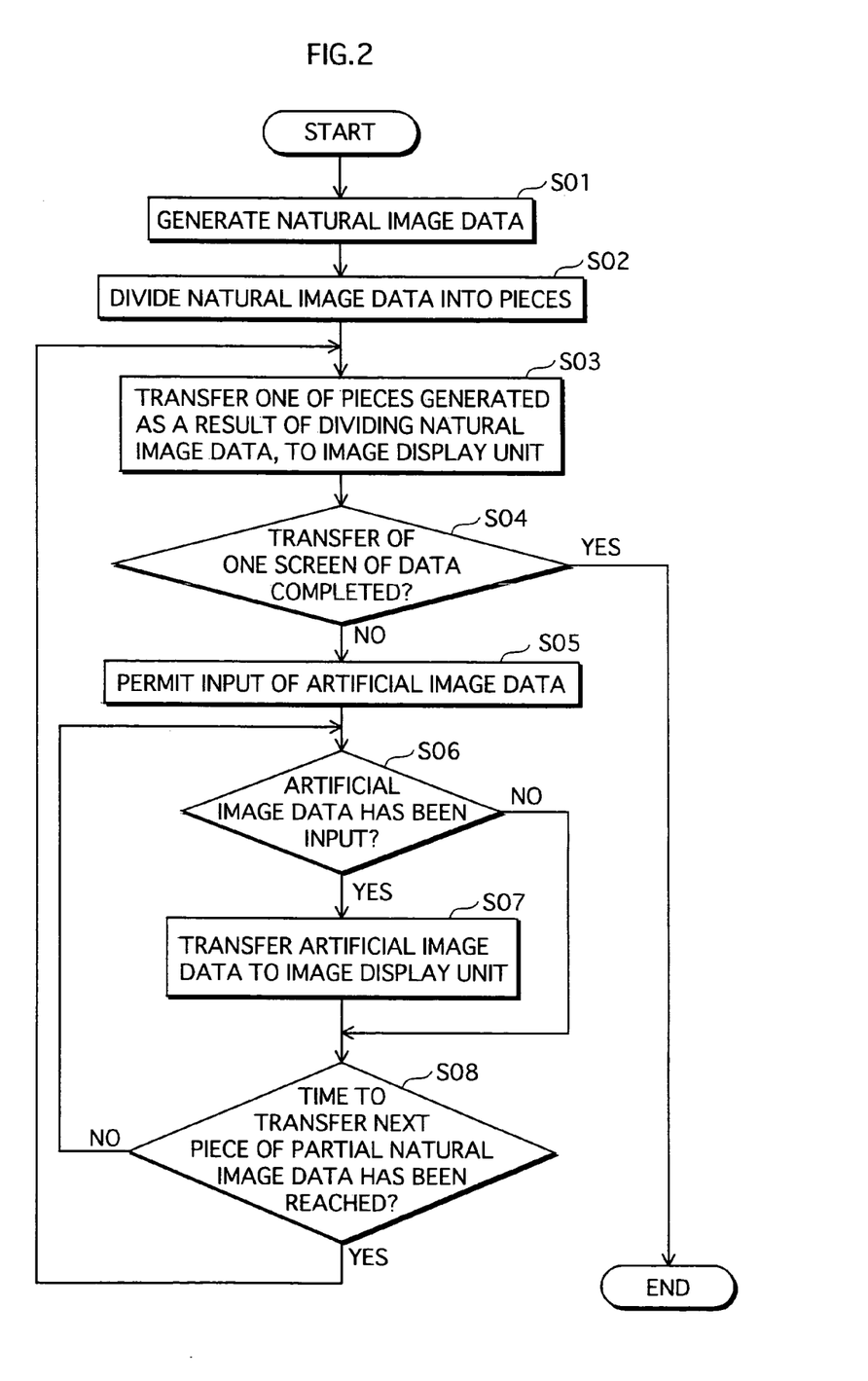
FIG. 2 is a flowchart showing the procedure of the arbitration of image data transfer.

FIG. 2 is a flowchart showing the procedure of the arbitration of image data transfer.

In step S01, the natural image data generation unit 101 generates the natural image data, and in step S02, divides the natural image data into smaller pieces whose data size is smaller than the data size of one screen.

In step S03, the image data transfer arbitration unit 103 transfers a piece of partial data, which is one of the pieces generated as a result of dividing the natural image data.

In step S04, the image data transfer arbitration unit 103 judges whether a transfer of one screen of data has been completed.

If it is judged in step S04 that a transfer of one screen of data has been completed ("YES" in step S04), the arbitration process ends. If it is judged in step S04 that a transfer of one screen of data has not been completed ("NO" in step S04), the control goes to step S05 in which the image data transfer arbitration unit 103 permits the artificial image data generation unit 102 to input artificial image data.

In the following step S06, the image data transfer arbitration unit 103 judges whether artificial image data has been input from the artificial image data generation unit 102.

If it is judged in step S06 that artificial image data has been input ("YES" in step S06), the control goes to step S07 in which the image data transfer arbitration unit 103 transfers the artificial image data to the image display unit 104.

If it is judged in step S06 that artificial image data has not been input ("NO" in step S06), the control goes to step S08 in which the image data transfer arbitration unit 103 judges whether a time to transfer the next piece of partial data has been reached. If it is judged in step S08 that the time to transfer the next piece of partial data has been reached ("YES" in step S08), the control returns to step S03 to transfer the next piece of partial data.

If it is judged in step S08 that the time to transfer the next piece of partial data has not been reached ("NO" in step S08), the control returns to step S06 to judge whether artificial image data has been input from the artificial image data generation unit 102.

With the above-described operation, it is possible to complete a transfer of natural image data in an assured manner within a predetermined time period.

Figure 3:
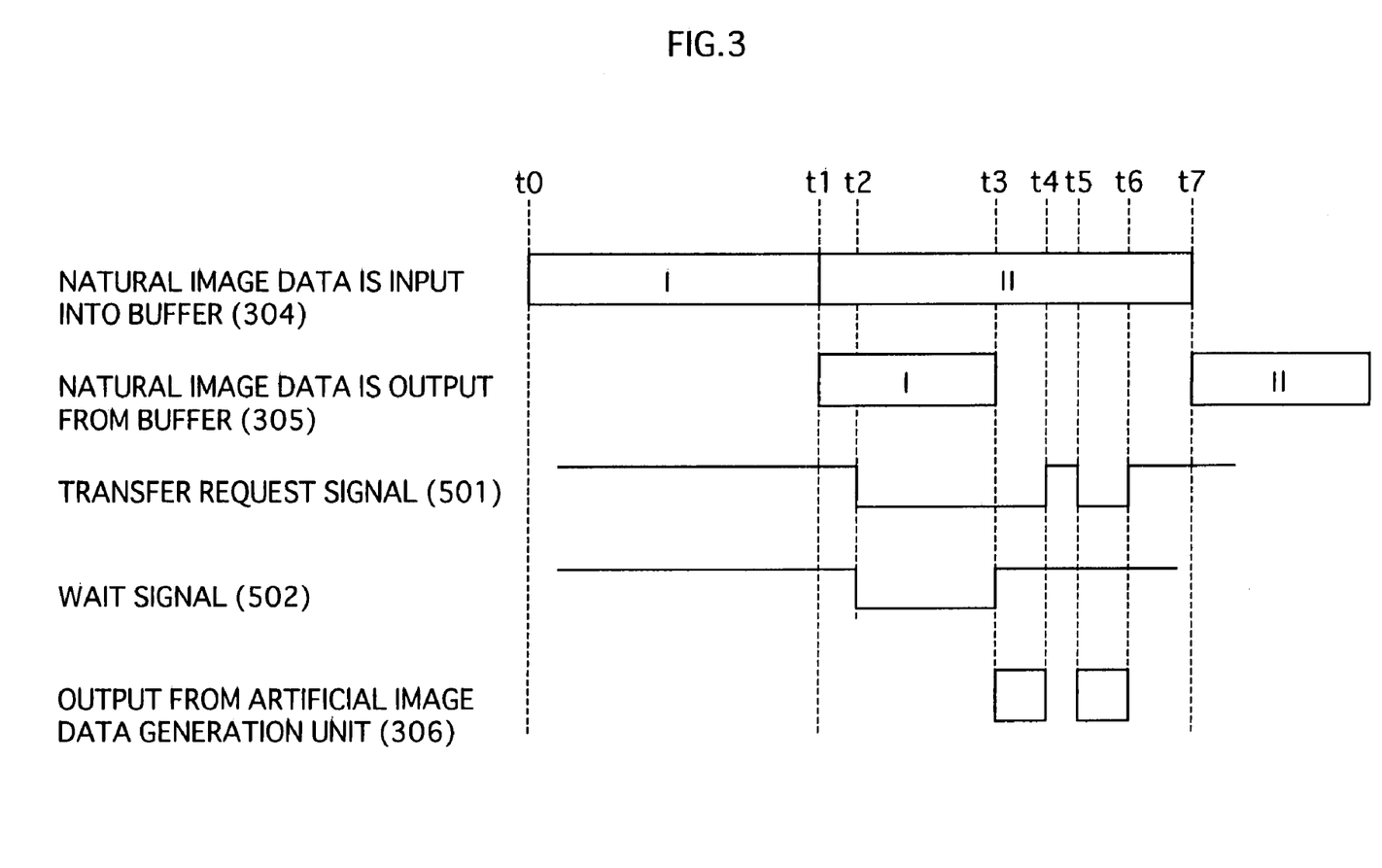
FIG. 3 is a time chart showing the input and output of the natural image data into/from the data buffer 302.

FIG. 3 is a time chart showing that natural image data (partial data) 305 is intermittently read by the image data transfer arbitration unit 103 and is transferred by the image display unit 104.

As shown in FIG. 3, partial data I is input into the data buffer 302 during a time period between time t0 and time t1, where the partial data I is one of the pieces generated as a result of dividing the natural image data.

After this, the partial data I is read from the data buffer 302 during a time period between time t1 and time t3, and the partial data I is transferred to the image display unit 104 via the image data transfer arbitration unit 103. Partial data II is input into the data buffer 302 during a time period between time t1 and time t7.

The partial data I is read from the data buffer 302 before time t3, and then transferred to the image display unit 104. This enables the image data transfer arbitration unit 103 to transfer the artificial image data during a time period between time t3 and time t7 while the partial data II is input.

Suppose here that the transfer request signal 501 is activated by the artificial image data generation unit 102 at time t2. It should noted that in the present embodiment, a signal can be at a high level or a low level, and a signal at the low level is in the active state.

The image data transfer arbitration unit 103 is transferring the partial data I at time t2. This means that the image data transfer arbitration unit 103 cannot transfer the artificial image data at time t2. The image data transfer arbitration unit 103 accordingly activates the wait signal 502 at time t2.

After the wait signal 502 is activated, the artificial image data generation unit 102 suspends the transfer of the artificial image data, and waits until the wait signal 502 is in the non-active state.

At time t3, the transfer of the partial data I is completed, and the image data transfer arbitration unit 103 changes the wait signal 502 to the high level, namely to the non-active state.

At time t3, because the wait signal 502 becomes the non-active state, the artificial image data generation unit 102 starts transmitting the artificial image data to the image data transfer arbitration unit 103 and the image data transfer arbitration unit 103 transfers the artificial image data during a period between times t3 and t4.

At time t5 when the artificial image data generation unit 102 activates the transfer request signal 501 and notifies the image data transfer arbitration unit 103 of the artificial image data transfer request, the image data transfer arbitration unit 103 immediately starts transferring the artificial image data because at the time, the image data transfer arbitration unit 103 is not transferring the natural image data.

The following describes modifications of the image display apparatus 1.

<Modification 1>

Figure 4:
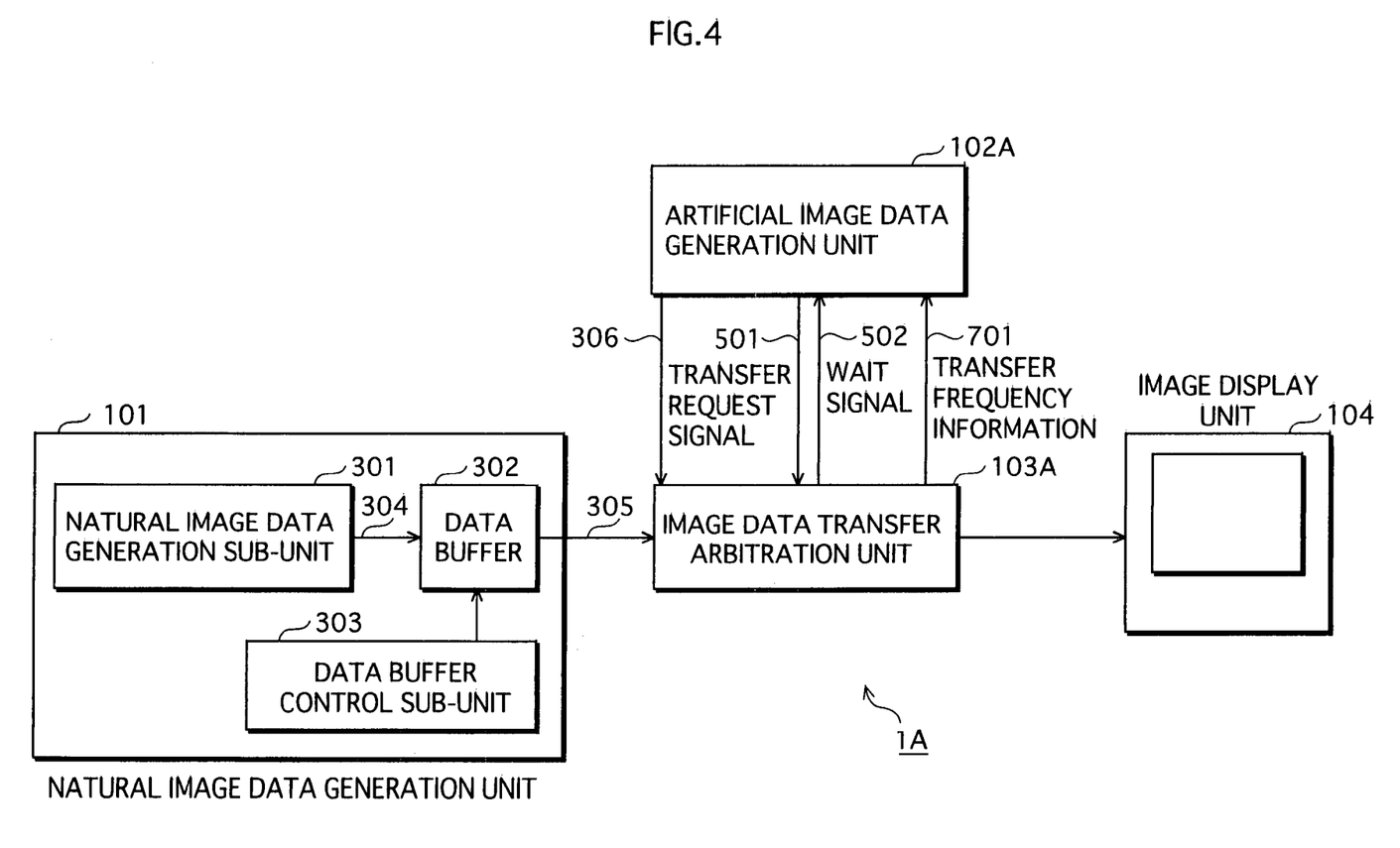
FIG. 4 shows the functional structure of the image display apparatus in Modification 1.

FIG. 4 shows the functional structure of the image display apparatus in Modification 1.

An image display apparatus 1A shown in FIG. 4 differs from the image display apparatus 1 shown in FIG. 1 in that an image data transfer arbitration unit 103A transmits transfer frequency information 701 to an artificial image data generation unit 102A.

The transfer process for transferring the natural image data is not performed continuously, nor with a constant frequency. That is to say, during some periods, the natural image data may be transferred with a high frequency, and during other periods, the natural image data may be transferred with a low frequency (or may not be transferred). For example, the natural image data may represent a video image, which includes a plurality of vertical blanking intervals in which no image signal is output.

By referring to the transfer frequency information received from the image data transfer arbitration unit 103A that indicates a frequency with which the natural image data is transferred, the artificial image data generation unit 102A transfers the artificial image data during periods in which the natural image data is transferred with low frequencies. This reduces the probability of suspending the transfer of the artificial image data in accordance with the instruction indicated by the activated wait signal. Also, due to the reduction in the wait time, the CPU achieving the artificial image data generation unit 102A can have more time to execute other processes.

<Modification 2>

Figure 5:
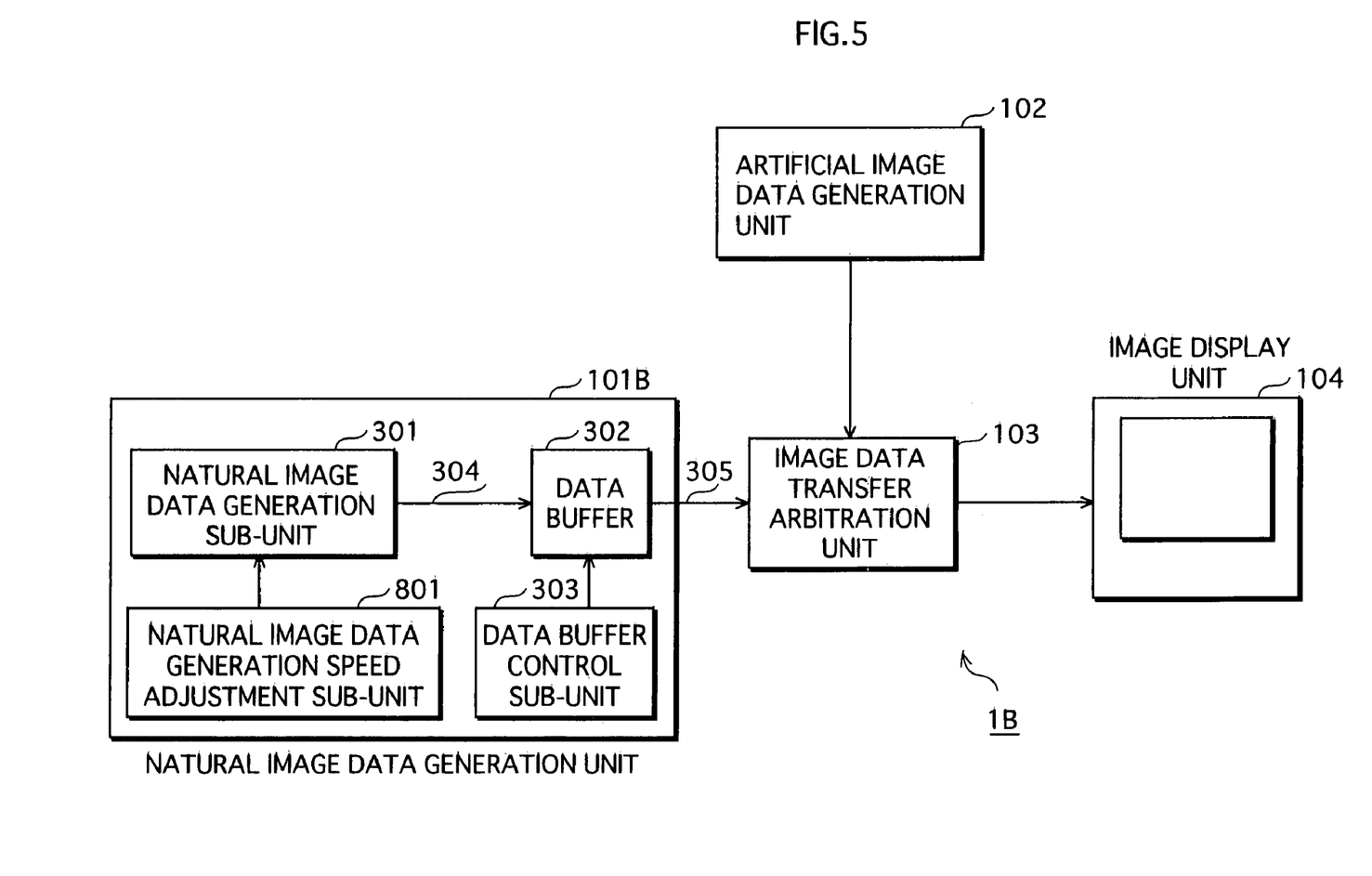
FIG. 5 shows the functional structure of the image display apparatus in Modification 2.

FIG. 5 shows the functional structure of the image display apparatus in Modification 2.

An image display apparatus 1B shown in FIG. 5 differs from the image display apparatus 1 shown in FIG. 1 in that a natural image data generation unit 101B includes a natural image data generation speed adjustment sub-unit 801.

This construction makes it possible to change the speed at which the natural image data is generated.

The maximum transfer speed depends on the frame size of the natural image for display on the screen of the image display unit 104. Accordingly, it is possible to generate the natural image data at a speed adjusted in accordance with the frame size of the natural image for display on the screen of the image display unit 104, and transfer the generated natural image data at an optimum speed.

<Modification 3>

Figure 6:
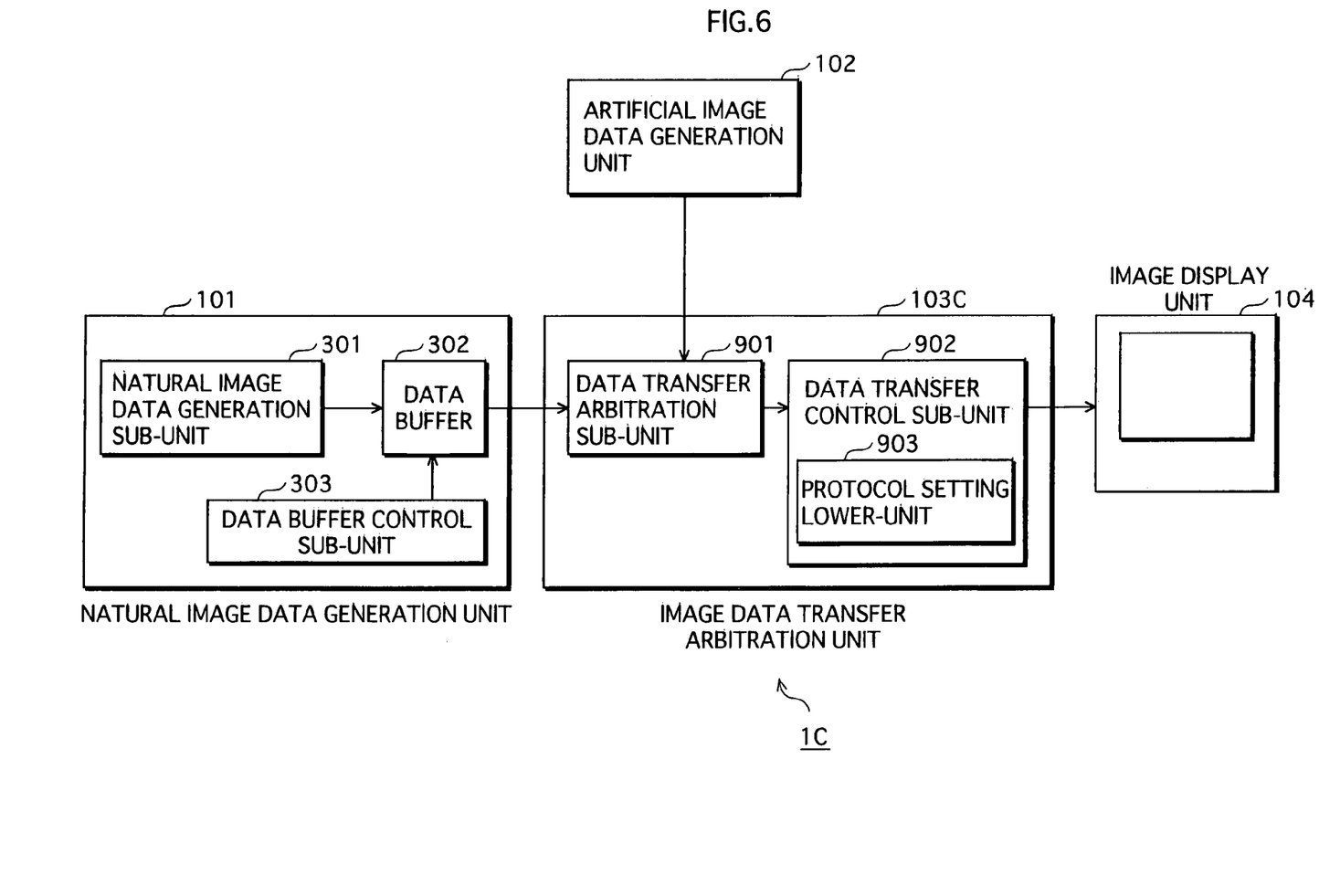
FIG. 6 shows the functional structure of the image display apparatus in Modification 3.

FIG. 6 shows the functional structure of the image display apparatus in Modification 3.

An image display apparatus 1C shown in FIG. 6 differs from the image display apparatus 1 shown in FIG. 1 in that an image data transfer arbitration unit 103C includes a data transfer arbitration sub-unit 901 and a data transfer control sub-unit 902, the data transfer control sub-unit 902 including a protocol setting lower-unit 903.

The data transfer arbitration sub-unit 901 arbitrates the transfer of the natural image data and the artificial image data.

The data transfer control sub-unit 902 controls a data transfer in accordance with a transfer protocol set by the protocol setting lower-unit 903.

The protocol setting lower-unit 903 selects a transfer protocol in accordance with a type of the image display unit 104, among a plurality of transfer protocols, and sets the selected transfer protocol.

An image display apparatus is usually designed so that an image display unit provided therein is connected to the CPU.

There are a lot of types of interface specifications that can be adopted for a CPU. Each interface specification differs from each other in, for example: how to multiplex or separate addresses and data; or timing with which an enable signal is output to permit a data input/output. Most of image display units conform to only limited types of interface specifications that can be adopted for a CPU.

With the above-mentioned construction in which the image data transfer arbitration unit 103C includes the protocol setting lower-unit 903, it is possible to select a transfer protocol that conform to both the image display unit and the interface specification adopted for the CPU, enabling the CPU to connect to the image display unit that does not conform to the interface specification of the CPU.

<Modification 4>

Figure 7:
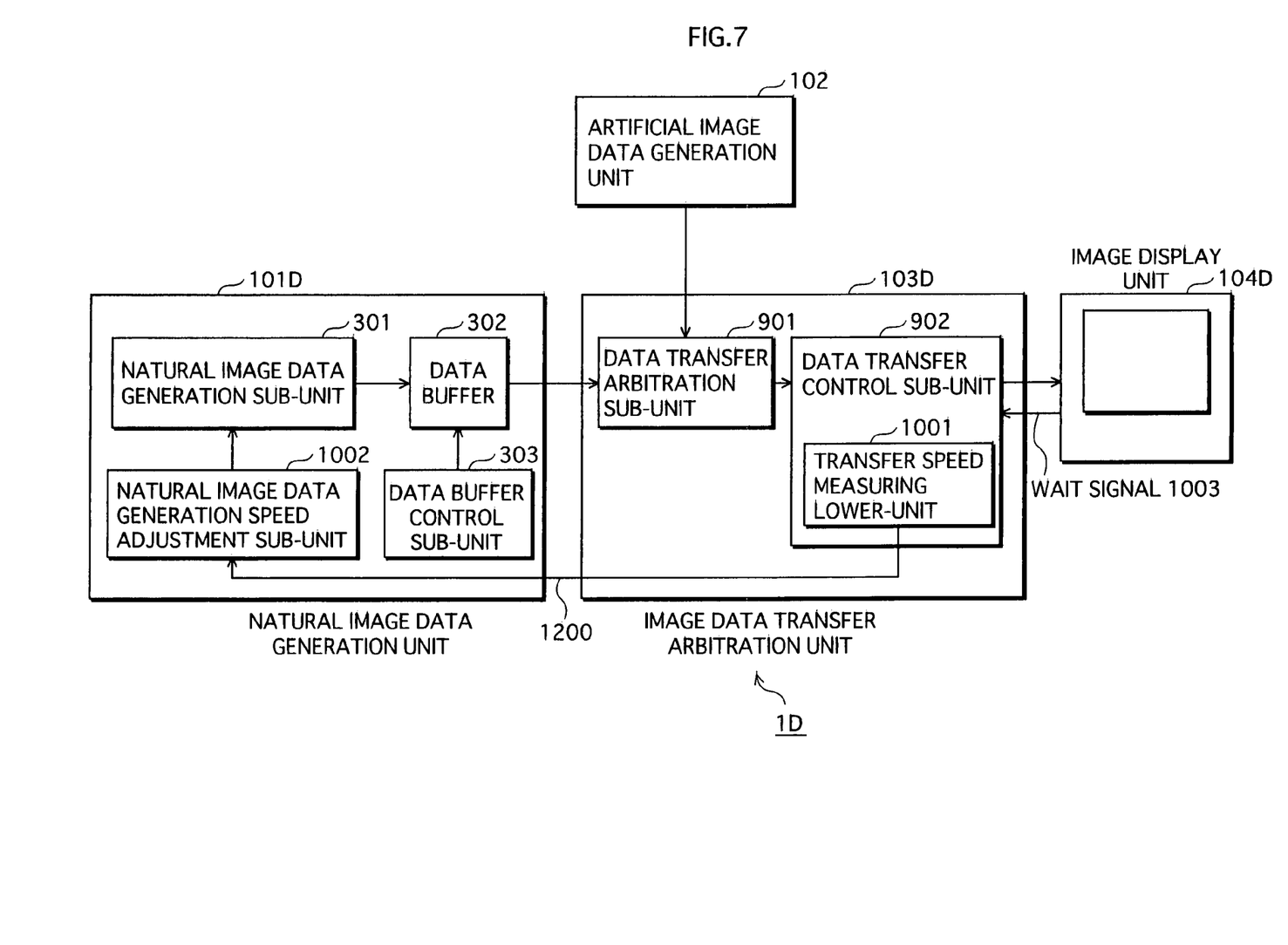
FIG. 7 shows the functional structure of the image display apparatus in Modification 4.

FIG. 7 shows the functional structure of the image display apparatus in Modification 4.

An image display apparatus 1D shown in FIG. 7 differs from the image display apparatus 1 shown in FIG. 1 in that a natural image data generation unit 101D includes a natural image data generation speed adjustment sub-unit 1002, an image data transfer arbitration unit 103D includes the data transfer arbitration sub-unit 901 and the data transfer control sub-unit 902, the data transfer control sub-unit 902 includes a transfer speed measuring lower-unit 1001, and the data transfer control sub-unit 902 receives a wait signal 1003 from an image display unit 104D.

The image display unit 104D, when it cannot continuously receive transferred data due to execution of a certain internal process (for example, a drawing process), activates the wait signal 1003 to notify the image data transfer arbitration unit 103D of an instruction to suspend the transfer of image data.

The data transfer arbitration sub-unit 901 arbitrates the transfer of image data.

Upon receiving the wait signal 1003 in the active state, the data transfer control sub-unit 902 performs a control so that the data transfer is suspended.

The transfer speed measuring lower-unit 1001 measures the image data transfer speed. The measured data transfer speed is notified to the natural image data generation speed adjustment sub-unit 1002, as data transfer speed information 1200.

The natural image data generation speed adjustment sub-unit 1002 adjusts the speed at which the natural image data is generated, based on the data transfer speed information 1200 notified from the transfer speed measuring lower-unit 1001.

With this construction, it is possible to prevent an overflow from occurring in the data buffer 302.

<Modification 5>

Figure 8:
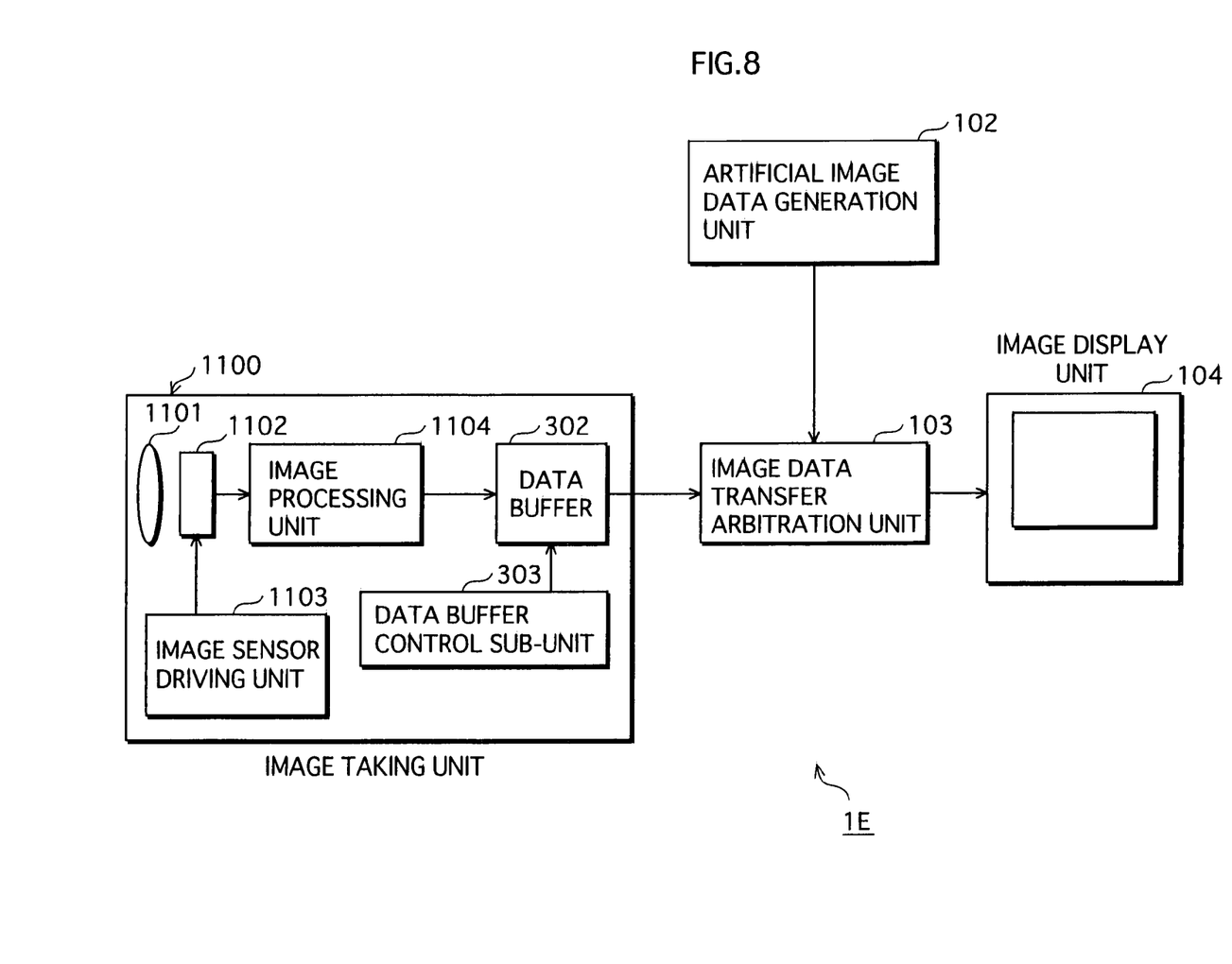
FIG. 8 shows the functional structure of the image display apparatus in Modification 5.

FIG. 8 shows the functional structure of the image display apparatus in Modification 5.

An image display apparatus 1E shown in FIG. 8 differs from the image display apparatus 1 shown in FIG. 1 in that it includes an image taking unit 1100 in place of the natural image data generation unit 101.

The image taking unit 1100 includes: a lens 1101 used to form an optical image; an image sensor 1102 for generating an electric signal by performing a light-to-electric conversion onto the optical image; an image sensor driving unit 1103 for driving an image sensor; an image processing unit 1104 for processing an output signal from the image sensor to generate an image in a predetermined format; the data buffer 302; and the data buffer control unit 303.

<Modification 6>

Figure 9:
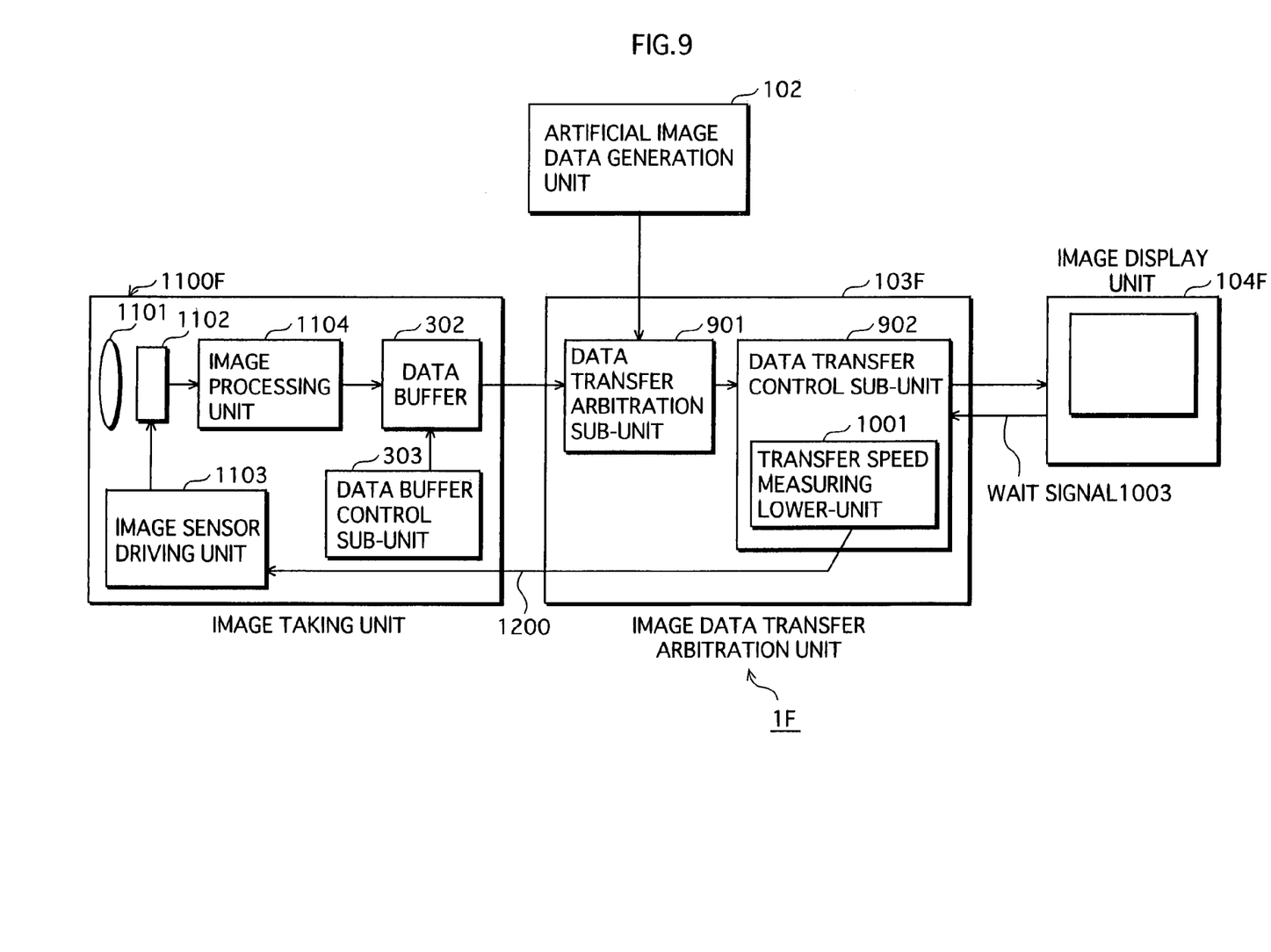
FIG. 9 shows the functional structure of the image display apparatus in Modification 6.

FIG. 9 shows the functional structure of the image display apparatus in Modification 6.

An image display apparatus 1F shown in FIG. 9 is a modification of the image display apparatus 1E shown in FIG. 8, and differs therefrom in that an image data transfer arbitration unit 103F includes the data transfer arbitration sub-unit 901 and the data transfer control sub-unit 902, the data transfer control sub-unit 902 includes the transfer speed measuring lower-unit 1001, and the data transfer control sub-unit 902 receives the wait signal 1003 from an image display unit 104F.

The image display unit 104F, when it cannot continuously receive transferred data due to execution of a certain internal process (for example, a drawing process), activates the wait signal 1003 to notify the image data transfer arbitration unit 103F of an instruction to suspend the transfer of image data.

Upon receiving the wait signal 1003 in the active state, the image data transfer arbitration unit 103F suspends the data transfer. This means that the image data transfer speed changes. The transfer speed measuring lower-unit 1001 measures the image data transfer speed, and notifies the image sensor driving unit 1103 of the data transfer speed information 1200 indicating the measured transfer speed. Upon receiving the information, the image sensor driving unit 1103 adjusts the speed at which the natural image data is generated, based on the notified data transfer speed information 1200.

With this construction, it is possible to prevent an overflow from occurring in the data buffer 302 even in the case where the transfer speed changes dynamically.

<Modification 7>

Figure 10:
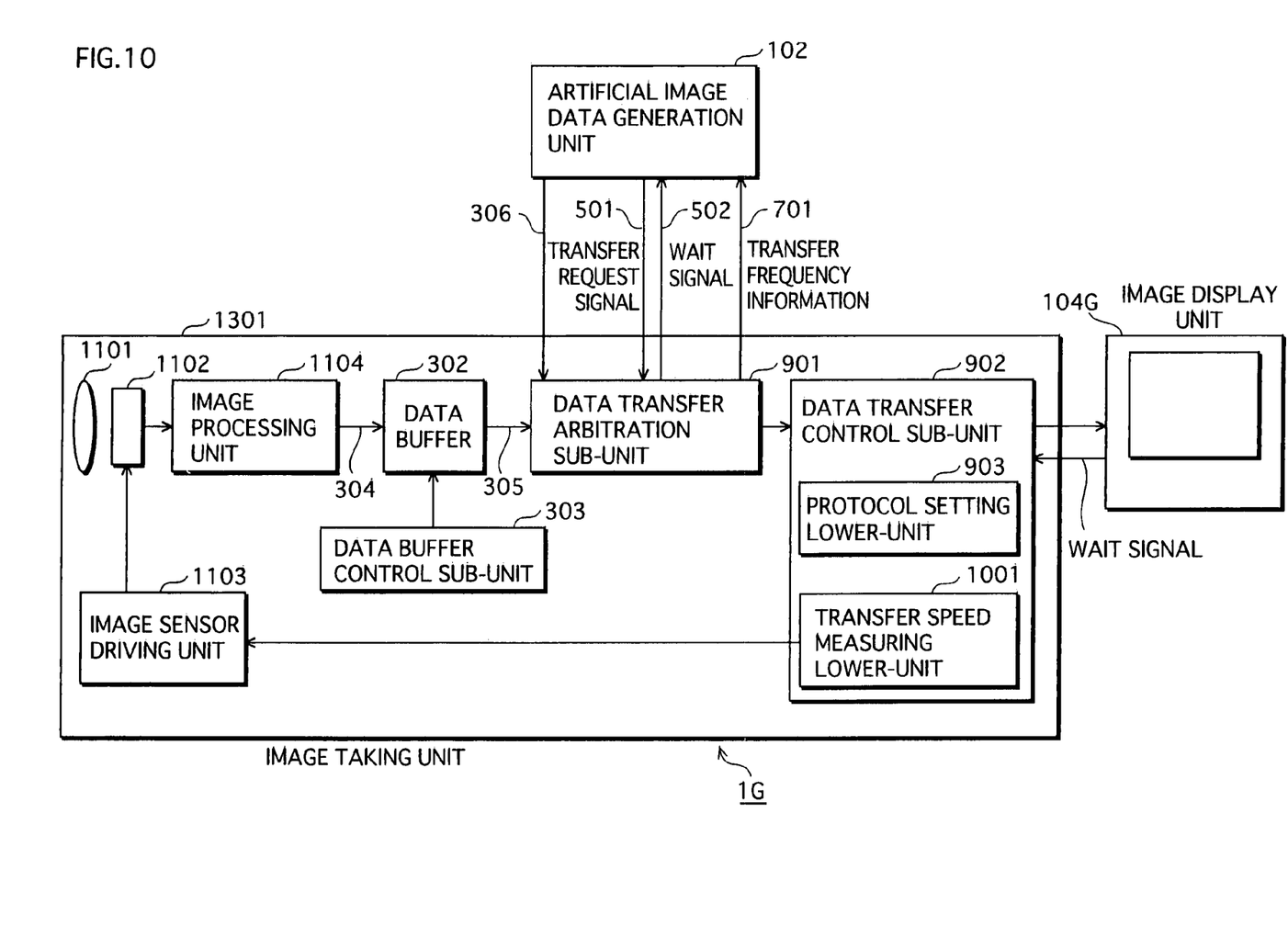
FIG. 10 shows the functional structure of the image display apparatus in Modification 7.

FIG. 10 shows the functional structure of the image display apparatus in Modification 7.

An image display apparatus 1G shown in FIG. 10 has a construction in which an image taking unit 1100F and the image data transfer arbitration unit 103F of the image display apparatus 1F of Modification 6 shown in FIG. 9 are achieved in a semiconductor chip 1301.

This construction realizes downsizing of the image display apparatus. It should be noted here that the artificial image data generation unit 102 and an image display unit 104G are achieved in different semiconductor chips. This is because it is desirable to allow various combinations of a CPU and a display to conform to various product specifications.

<Supplemental Notes>

The present invention is not limited to the above-described embodiment. That is to say, the present invention also includes the following modifications.

(1) In the above embodiment, two types of image data (natural image data and artificial image data), which are generated by two different generators, are transferred to the image display unit in parallel. However, a plurality of pieces of artificial image data generated by different generators may be transferred to the image display unit in parallel, or a plurality of pieces of natural image data generated by different generators may be transferred to the image display unit in parallel.

For example, suppose three types of image data (the first, second, and third image data) are generated by different generators, respectively, where the first image data represents a main image, the second and third image data represents a sub-image. The three types of image data are transferred to the image display unit as follows. The first image data is divided into a plurality of data pieces which each have a predetermined size smaller than a data size of one screen. The data pieces of the first image data are intermittently transferred to the image display unit. Part or all of the second image data and/or the third image data are transferred to the image display unit during a period in which any of the data pieces is not transferred to the image display unit.

With this construction, the first, second, and third image data is transferred to the image display unit, without suspending the transfer of the first image data.

(2) In the above embodiment, the natural image and the artificial image are respectively processed as the main image and the sub-image so that the natural image is displayed smoothly as a high-quality image. However, the natural image and the artificial image are respectively processed as the sub-image and the main image so that the artificial image is displayed smoothly as a high-quality image, which is achieved by transferring the data pieces of the artificial image data intermittently to the image display unit, and transferring part or all of the natural image data to the image display unit during a period in which any of the data pieces is not transferred to the image display unit.

(3) The image display apparatus of the present invention is applicable to electronic devices, such as a camera-equipped mobile-phone, a digital camera, PDA (Personal Digital Assistance), and a car-mounted navigation system, which can display images represented by two or more types of image data.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image display apparatus comprising:
    a first image data generating unit operable to generate and output first image data;
    a second image data generating unit operable to generate second image data and notify a request for a transfer of the generated second image data by outputting the second image data;
    an image display unit operable to generate a composite image from the first image data and the second image data and display the generated composite image; and
    a transfer arbitration unit operable to receive data pieces of the first image data one by one from the first image data generating unit and transfer the received data pieces of the first image data one by one to the image display unit, operable to receive and transfer the second image data to the image display unit during a period in which any data piece of the first image data is not transferred to the image display unit, and
    operable to, when receiving the request for the transfer of the second image data during a period in which a data piece of the first image data is transferred to the image display unit, output a wait signal to notify the second image data generation unit of an instruction to suspend the transfer of the second image data,
    wherein the transfer arbitration unit includes a sub-unit operable to notify the second image data generating unit of transfer frequency information that indicates a frequency with which the data pieces of the first image data are transferred, and
    the second image data generating unit includes a sub-unit operable to notify the transfer arbitration unit of a request for a transfer of the generated second image data, based on the transfer frequency information notified by the transfer arbitration unit.

2. The image display apparatus of claim 1, wherein
the first image data generating unit includes:
a buffer having a predetermined size; and
a buffer control sub-unit operable to write the first image data into the buffer at a predetermined speed, intermittently read the data pieces of the first image data one by one from the buffer, and output the read data pieces to the transfer arbitration unit.

3. The image display apparatus of claim 1, wherein
the image display unit includes a sub-unit operable to notify the transfer arbitration unit of an instruction to suspend transfers of the first and second image data, and
the transfer arbitration unit suspends the transfers of the first and second image data to the image display unit, in accordance with the instruction to suspend the transfers notified by the image display unit.

4. The image display apparatus of claim 1, wherein
the transfer arbitration unit includes
a protocol setting sub-unit operable to set transfer protocols respectively for transferring the first image data and the second image data to the image display unit.

5. The image display apparatus of claim 1, wherein
the first image data generating unit includes
an image data generation speed adjustment sub-unit operable to adjust a speed at which the first image data is generated, in accordance with a frame size of an image for display on the image display unit.

6. The image display apparatus of claim 5, wherein
the transfer arbitration unit includes
a transfer speed measuring sub-unit operable to measure a speed at which image data is transferred to the image display unit, and
the image data generation speed adjustment sub-unit adjusts the speed at which the first image data is generated, based on a result of the measurement of the image data transfer speed by the transfer speed measuring sub-unit.

7. The image display apparatus of claim 1, wherein the first image data generating unit generates a plurality of partial data that constitute the first image data, and outputs the generated plurality of partial data one by one intermittently to the image display unit.

8. The image display apparatus of claim 1, wherein
the first image data generating unit includes:
an image sensor operable to generate an electric signal by performing a light-to-electric conversion onto an optical image formed via a lens;
an image sensor driving unit operable to drive the image sensor; and
an image processing unit operable to generate the first image data by processing the electric signal generated by the image sensor.

9. The image display apparatus of claim 1, wherein
the image display unit includes:
an image generating unit operable to generate a predetermined image automatically when receiving a predetermined instruction.

10. The image display apparatus of claim 1, wherein
the second image data generating unit includes:
a transfer unit operable to transfer the generated second image data to the image display unit; and
an issuing unit operable to issue an instruction for causing the image display unit to generate a predetermined image.

11. The image display apparatus of claim 1, wherein
the first image data generating unit and the transfer arbitration unit have been formed in one semiconductor chip.

12. The image display apparatus of claim 1, wherein
the first image data is natural image data of a still image or a moving image,
the second image data is artificial image data being character data or graphic data, and
the image display unit includes a combining unit operable to combine the natural image data with the artificial image data.

13. An image data transfer method for use in an image display apparatus including: an image display unit operable to generate and output first image data; a second image data generating unit operable to generate second image data and notify a request for a transfer of the generated second image data by outputting the second image data; an image display unit operable to generate a composite image from the first image data and the second image data and display the generated composite image; and a transfer arbitration unit operable to receive data pieces of the first image data one by one from the first image data generating unit and transfer the received data pieces of the first image data one by one to the image display unit, and operable to receive and transfer the second image data to the image display unit during a period in which any data piece of the first image data is not transferred to the image display unit,
wherein the transfer arbitration unit includes a sub-unit operable to notify the second image data generating unit of transfer frequency information that indicates a frequency with which the data pieces of the first image data are transferred, and
the second image data generating unit includes a sub-unit operable to notify the transfer arbitration unit of a request for a transfer of the generated second image data, based on the transfer frequency information notified by the transfer arbitration unit,
the image data transfer method comprising the step of
when receiving the request for the transfer of the second image data during a period in which a data piece of the first image data is transferred to the image display unit, outputting a wait signal to notify the second image data generation unit of an instruction to suspend the transfer of the second image data.

14. An image display apparatus comprising:
a first image data generating unit operable to generate and output first image data;
a second image data generating unit operable to generate second image data and notify a request for a transfer of the generated second image data by outputting the second image data;
an image display unit operable to generate a composite image from the first image data and the second image data and display the generated composite image; and
a transfer arbitration unit operable to receive data pieces of the first image data one by one from the first image data generating unit and transfer the received data pieces of the first image data one by one to the image display unit, operable to receive and transfer the second image data to the image display unit during a period in which any data piece of the first image data is not transferred to the image display unit, and
operable to, when receiving the request for the transfer of the second image data during a period in which a data piece of the first image data is transferred to the image display unit, output a wait signal to notify the second image data generation unit of an instruction to suspend the transfer of the second image data, wherein the image display unit includes a sub-unit operable to notify the transfer arbitration unit of an instruction to suspend transfers of the first and second image data, and the transfer arbitration unit suspends the transfers of the first and second image data to the image display unit, in accordance with the instruction to suspend the transfers notified by the image display unit.

15. The image display apparatus of claim 14, wherein the first image data generating unit includes:

a buffer having a predetermined size; and a buffer control sub-unit operable to write the first image data into the buffer at a predetermined speed, intermittently read the data pieces of the first image data one by one from the buffer, and output the read data pieces to the transfer arbitration unit.

16. The image display apparatus of claim 14, wherein the transfer arbitration unit includes a protocol setting sub-unit operable to set transfer protocols respectively for transferring the first image data and the second image data to the image display unit.

17. The image display apparatus of claim 14, wherein the first image data generating unit includes an image data generation speed adjustment sub-unit operable to adjust a speed at which the first image data is generated, in accordance with a frame size of an image for display on the image display unit.

18. The image display apparatus of claim 17, wherein the transfer arbitration unit includes a transfer speed measuring sub-unit operable to measure a speed at which image data is transferred to the image display unit, and the image data generation speed adjustment sub-unit adjusts the speed at which the first image data is generated, based on a result of the measurement of the image data transfer speed by the transfer speed measuring sub-unit.

19. The image display apparatus of claim 14, wherein the first image data generating unit generates a plurality of partial data that constitute the first image data, and outputs the generated plurality of partial data one by one intermittently to the image display unit.

20. The image display apparatus of claim 14, wherein the first image data generating unit includes:

an image sensor operable to generate an electric signal by performing a light-to-electric conversion onto an optical image formed via a lens;

an image sensor driving unit operable to drive the image sensor; and an image processing unit operable to generate the first image data by processing the electric signal generated by the image sensor.

21. The image display apparatus of claim 14, wherein the image display unit includes:

an image generating unit operable to generate a predetermined image automatically when receiving a predetermined instruction.

22. The image display apparatus of claim 14, wherein the second image data generating unit includes:

a transfer unit operable to transfer the generated second image data to the image display unit; and an issuing unit operable to issue an instruction for causing the image display unit to generate a predetermined image.

23. The image display apparatus of claim 14, wherein the first image data generating unit and the transfer arbitration unit have been formed in one semiconductor chip.

24. The image display apparatus of claim 14, wherein the first image data is natural image data of a still image or a moving image, the second image data is artificial image data being character data or graphic data, and the image display unit includes a combining unit operable to combine the natural image data with the artificial image data.

25. An image data transfer method for use in an image display apparatus including: an image display unit operable to generate and output first image data; a second image data generating unit operable to generate second image data and notify a request for a transfer of the generated second image data by outputting the second image data; an image display unit operable to generate a composite image from the first image data and the second image data and display the generated composite image; and a transfer arbitration unit operable to receive data pieces of the first image data one by one from the first image data generating unit and transfer the received data pieces of the first image data one by one to the image display unit, and operable to receive and transfer the second image data to the image display unit during a period in which any data piece of the first image data is not transferred to the image display unit, wherein the image display unit includes a sub-unit operable to notify the transfer arbitration unit of an instruction to suspend transfers of the first and second image data, and the transfer arbitration unit suspends the transfers of the first and second image data to the image display unit, in accordance with the instruction to suspend the transfers notified by the image display unit, the image data transfer method comprising the step of when receiving the request for the transfer of the second image data during a period in which a data piece of the first image data is transferred to the image display unit, outputting a wait signal to notify the second image data generation unit of an instruction to suspend the transfer of the second image data.

* * * * *

UNITED STATES PATENT AND TRADEMARK OFFICE
CERTIFICATE OF CORRECTION

| | | |
|---|---|---|
| PATENT NO. | : 7,619,634 B2 | Page 1 of 1 |
| APPLICATION NO. | : 10/992103 | |
| DATED | : November 17, 2009 | |
| INVENTOR(S) | : Kazuyuki Inokuma | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1398 days.

Signed and Sealed this

Twenty-sixth Day of October, 2010

David J. Kappos
*Director of the United States Patent and Trademark Office*